United States Patent [19]

Girovich

[11] Patent Number: 5,435,923
[45] Date of Patent: Jul. 25, 1995

[54] METHOD FOR THE TREATMENT OF SEWAGE SLUDGE AND THE LIKE

[75] Inventor: Mark Girovich, Baltimore, Md.

[73] Assignee: Bio Gro Systems, Inc., Annapolis, Md.

[21] Appl. No.: 147,588

[22] Filed: Nov. 5, 1993

Related U.S. Application Data

[63] Continuation-in-part of Ser. No. 854,896, Mar. 20, 1992, Pat. No. 5,259,977.

[51] Int. Cl.⁶ ............................................. B01D 37/00
[52] U.S. Cl. ................................ 210/770; 210/751; 210/609; 210/764; 210/774; 210/742
[58] Field of Search ............... 210/770, 771, 774, 751, 210/181, 180, 609, 750, 738, 739, 743, 742, 764, 768, 638, 639

[56] References Cited

U.S. PATENT DOCUMENTS

| | | |
|---|---|---|
| 3,941,357 | 3/1976 | Wurtz .................................. 259/104 |
| 3,963,471 | 6/1976 | Hampton . |
| 4,079,003 | 3/1978 | Manchak ............................. 210/747 |
| 4,133,756 | 1/1979 | Arai et al. ........................... 210/742 |
| 4,270,279 | 6/1981 | Roediger ............................. 210/609 |
| 4,306,978 | 12/1981 | Wurtz ................................. 210/750 |
| 4,509,696 | 4/1985 | Donaldson ......................... 210/751 |
| 4,781,842 | 11/1988 | Nicholson ........................... 210/751 |
| 4,956,926 | 9/1990 | Glorioso .............................. 34/411 |
| 4,997,572 | 3/1991 | Wurtz .................................. 210/751 |
| 5,069,801 | 12/1991 | Girovich ............................. 210/720 |
| 5,135,664 | 8/1992 | Burnham ............................. 210/751 |
| 5,186,840 | 2/1993 | Christy et al. ...................... 210/709 |
| 5,196,043 | 3/1993 | Wurtz .................................. 210/609 |
| 5,217,624 | 6/1993 | Yamane et al. ..................... 210/770 |
| 5,229,011 | 7/1993 | Christy, Sr. et al. ............... 210/764 |
| 5,242,601 | 9/1993 | Manchak, Jr. et al. ............ 210/751 |
| 5,246,596 | 9/1993 | Baldwin, Jr. et al. .............. 210/751 |
| 5,259,977 | 11/1993 | Girovich et al. .................... 210/770 |
| 5,275,733 | 1/1994 | Burnham ............................. 210/751 |
| 5,277,825 | 1/1994 | Tobler et al. ....................... 210/739 |
| 5,277,826 | 1/1994 | Burns et al. ........................ 210/751 |

FOREIGN PATENT DOCUMENTS

4157000  5/1992  Japan .................................... 210/742

Primary Examiner—Robert A. Dawson
Assistant Examiner—Ana M. Fortuna
Attorney, Agent, or Firm—Sixbey, Friedman, Leedom & Ferguson

[57] ABSTRACT

A process for the production of a durable granular or pelletized sludge product is disclosed whereby a minimal amount of high calcium oxide material is utilized for pathogenic stabilization, a portion of the resulting hot mixture being recycled back to the mixing stage to reduce the requisite lime consumption by utilizing unreacted lime, for energy recovery and to increase dryness.

17 Claims, 2 Drawing Sheets

METHOD FOR THE TREATMENT OF SEWAGE SLUDGE AND THE LIKE

This Application is a Continuation-In-Part of U.S. application Ser. No. 854,896 filed Mar. 20, 1992, now U.S. Pat. No. 5,259,977.

TECHNICAL FIELD

The present invention relates to a treatment process for converting waste water sludge into a pathogen free, uniform, durable granular product intended for beneficial use as an agricultural soil amendment or other like uses. Particularly the present invention relates to a process for treating the dewatered sludge by using quicklime (calcium oxide) in an economical manner to achieve sludge pasteurization, reduction of pathogenic organisms and vector attraction reduction, control of offensive odors and production of an end product desirable for beneficial use.

BACKGROUND ART

The use of quicklime and similar alkaline materials for sanitation has a long history. The Roman army was known to spread quicklime in their latrines. In the last century, with the development of modern sewage systems, the use of lime products for flocculation of solids in raw sewage or liquid sludges has been developed. The role of alkaline materials in pH adjustment and the beneficial effect of pH in pathogen reduction is a more recent development, having occurred in only the last 60 years. The end result of research into pathogen reduction in wastewater treatment has prompted the U.S. Environmental Protection Agency to promulgate regulations specifying environmentally sound treatment criteria. More specifically, the EPA's standards for the use or disposal of sewage sludge (40 CFR 503; "Methods for Treatment and Disposal of Sewage Sludge," Feb. 19, 1993) establishes methods for achieving pathogen and vector attraction reduction using alkalinity (pH) and temperature criteria.

The aforementioned EPA regulations outline a number of chemical processes allowed to treat sludge to render it suitable for beneficial use in agriculture and similar application. The regulations establish two classes of sludge treatment products: Class A and Class B. A Class A (former PFRP or Process to Further Reduce Pathogens) product can be achieved by heating the sludge to no less than 70° C. for no less than 30 min. (pasteurization) while simultaneously raising the product pH to no less than 12 and keeping this pH level for a predetermined amount of time (pH of 12 for 2 hours followed by a pH of 11.5 for 22 hours). Adding quicklime to dewatered sludge can achieve the aforementioned pH, temperature and time conditions.

A majority of research in this field involves the pathogenic stabilization of sludge through pH adjustment and heat generated from the exothermic reaction of quicklime with water. U.S. Pat. No. 4,270,279 issued to Roediger and U.S. Pat. No. 4,306,978 issued to Wurtz disclose methods utilizing such research. U.S. Pat. No. 4,270,279 discloses the gentle handling of partially dewatered sludge cake and dusting only the surfaces of sludge particles thus resulting in a granular product; however, this process can only be carried out using partially dewatered sludge cake in sheet form prepared by belt filter presses.

U.S. Pat. No. 4,306,978 discloses a process which utilizes dewatered sludge cake from any source, however a high dose of quicklime is necessary in carrying out the process. The thorough mixing of the quicklime in this process, as compared to only surface dusting in the Roediger process, is a major reason for the increased quicklime usage in this process. In actual tests using the same type sludge blender as described in U.S. Pat. No. 4,306,978, that being the blender described in U.S. Pat. 3,941,357, it was found that 25% more quicklime was required to produce a granular product than is needed to meet EPA PFRP pH and temperature standards.

Enhanced granularization or pelletization of sludges has been taught in a number of disclosures such as U.S. Pat. No. 3,963,471 issued to Hampton, U.S. Pat. No. 4,956,926 issued to Glorioso, and U.S. Pat. No. 5,069,801 issued to Girovich. Each of these patents teach the recycling of a portion of the pelletized end product to promote further drying and pelletization. The drawback to each of these systems is that all of the recycle material must be reheated because the recycled product is obtained from the end of the process and after the product has been subjected to a drying process where the material inherently cools. In doing so, valuable heat energy is lost.

Lime is the major expense in the lime treatment process. For example, in order to meet current Class A (former PFRP) requirements mandated by U.S. EPA (40 CFR, Part 503) mentioned above significant amounts of lime are to be used. Lime ratio, i.e. tons of lime per dry ton of sludge must be in the range of 0.9 to 2.0 depending upon moisture content of the incoming sludge (usually between 15% and 35% total solids) and the end product dryness required for beneficial use (usually 45% to 60% total solids).

Accordingly, there is clearly a need for a process which can meet the EPA Class A pH, temperature and time standards while minimizing the amount of quicklime necessary in carrying out the process. Moreover, there is a need for a process which efficiently and effectively achieves a virtually pathogen free end product which is unsuitable for the regrowth of undesirable organisms. Furthermore, there is a need for a process which minimizes particulate and gaseous emissions while producing a durable granular or pelletized sludge product for use as a soil amendment or fertilizer through a more energy efficient granulation or pelletization method.

SUMMARY OF THE INVENTION

It is a primary object of the present invention to provide a process which overcomes the shortcomings associated with the aforementioned prior art processes.

Another object of the present invention is to provide a novel process for the reduction of quicklime or other suitable material while producing a pathogen-free, dry, granular and product suitable for beneficial use.

It is a further object of the present invention to provide a process for accepting any type of dewatered sludge cake produced in any manner for processing into a granular pathogenically stabilized sludge product.

It is another object of the present invention to utilize a portion of the product emanating from the mixer in a recycle loop back to the mixing stage, such recycle step involving moisture reduction in order to enhance dryness.

A further object of the present invention is to minimize particulate and gaseous emissions.

Yet another object of the present invention is to recycle the mixture emanating from the mixer in order to utilize unreacted lime therein and to capture the heat energy generated by such mixture.

These, as well as additional objects of the present invention, are attained by reacting the sludge and quicklime together in a mixer at a blending stage which attains pathogenic stabilization through pH and temperature adjustment, then recycling a portion of the mixed product emanating from the mixer back to the initiation of the mixing process to increase the solids content within the mixer and allow for a reduction in the consumption of quicklime.

It has been found that recycling of the end product back to mixing step significantly reduces lime consumption and as a result provides for better process economics. In the mixing step, lime exothermically reacts with water contained in the sludge heating the mixture and raising its pH. However, lime-water reaction continues beyond the confines of the mixing and conveying steps and, as a result, a significant amount of heat energy is lost, i.e., this heat energy does not participate in the heating of the mixture. Accordingly, in order to maintain the mandated temperature of no less than 70° C., more lime is needed in the mixing step. Further, during lime treatment a significant amount of ammonia is released as taught by the prior art. If the mixture leaves the mixing and conveying step in the once-through flow, ammonia continues to be released beyond the confines of the mixing and conveying step where it is much more difficult to control.

Ammonia and other odorous compounds released during mixing and conveying steps are forcefully ventilated from the totally enclosed mixing/conveying equipment and effectively treated in the air/odor pollution control equipment such as, for example, a wet scrubber. As soon as the end product leaves the enclosed equipment, it becomes significantly more difficult and expensive to control ammonia and other exhaust compounds because they are released in the open space such as storage facility, transportation vehicles, etc.

By recycling (returning) the mixture back into the mixer, the following advantages are realized:

1. Economic Lime Utilization. Unreacted portion of lime is returned to the mixing and conveying portion of the process thus the lime is reacted for longer period of time thus achieving better lime utilization.
2. Energy Recovery. Heat energy contained in the hot mixture is returned back and takes part in the heating.
3. Better Odor/Air Emission Control. Ammonia and other gaseous and particulate pollutants released during the treatment are better controlled by exposing the mixture again to ventilation and removal in the enclosed mixing and conveying equipment.
4. Increasing End Product Dryness. The end product dryness at the mixer discharge is increased thus resulting in an end product more suitable for beneficial uses.

The process for treating partially dewatered sludge in accordance with a first embodiment of the present invention includes introducing a predetermined amount of partially dewatered sludge into a mixer, adding a predetermined amount of alkaline material such as quicklime to the sludge within the mixer in a sufficient quantity to effect an exothermic reaction for heating the mixture to a predetermined temperature level and raising the pH level of the mixture. During the process of heating the material, water vapor is driven off. In addition, the alkaline material reduces odor by combining with malodorous compounds rendering them inactive and by raising the pH value to above 9, thus forcing ammonia out of solution. Ammonia can then be captured from the mixer exhaust air and sent back to the wastewater treatment plant or process for use as a fertilizer supplement to the end product. The mixture is then transferred from the mixer by a transferring means with the mixture being retained in the mixer and transferring means for a predetermined time period so as to provide a product having a predetermined alkalinity level which is void of pathogenic organisms. The mixture is then further transferred to an agglomerating device where a predetermined amount of dried end product material is added to the mixture to promote agglomeration of the mixture to provide a pelletized product having a predetermined moisture content. Each particle of the dried end product material becomes a central nucleus around which the wetter newly produced sludge material is coated. As the pellets are recycled, layers of wetter material are added and cured or dried. Once a pellet reaches a desired size it can be removed from the process by screening. The process further includes diverting at least a portion of the agglomerated material from the agglomerating device to a moisture reducing device for reducing the moisture content of the diverted material. At least a portion of the diverted material then being returned to the agglomerating device to be used to promote agglomeration therein, with the finished product then being withdrawn from the agglomerating device and/or the moisture reducing device.

The aforementioned process is carded out by an apparatus for treating partially dewatered sludge in accordance with the present invention which includes a mixer for mixing materials supplied thereto, a first feed device for feeding a predetermined amount of partially dewatered sludge to the mixer and a second feed device for feeding a predetermined amount of alkaline material to the mixer for mixing with the sludge to produce a mixture having a predetermined alkalinity level and predetermined temperature for a predetermined period of time. The apparatus further includes an agglomeration device for agglomerating the mixture of the sludge and alkaline material and a transferring device for transferring the mixture from the mixer to an input of the agglomeration device. A discharge device is further provided for discharging the agglomerated product from an output of the agglomeration device with at least a portion of the agglomerated product being diverted to a moisture reduction device by a diverter for reducing the moisture content of at least a portion of the agglomerated product. Once the moisture content of the agglomerated product is reduced by the moisture reduction device, a recycling conveyor is provided for returning at least a portion of the diverted product to the agglomeration device for mixing with the mixture so that a final product is produced having a predetermined moisture content.

In accordance with a preferred embodiment of the present invention, the process includes feeding partially dewatered sludge and an alkaline material such as quicklime to a mixer where the sludge and alkaline material are intimately mixed with one another with a portion of the mixture which is discharged from the mixer being recycled to the forward end of the mixer. Diverting and recycling 10% to 60% of the product flow back to the mixer provides for a reduction in lime consumption of up to 40% which is significant in that lime is the largest expense in the treatment of dewatered sludge. This savings in lime consumption being due to the energy recovery and utilization of unreacted lime from the recycled product.

These as well as additional advantages of the present invention will become apparent from the following detailed description of the preferred embodiment with reference to the figures.

DETAILED DESCRIPTION OF THE PRESENT INVENTION

Figure 1:
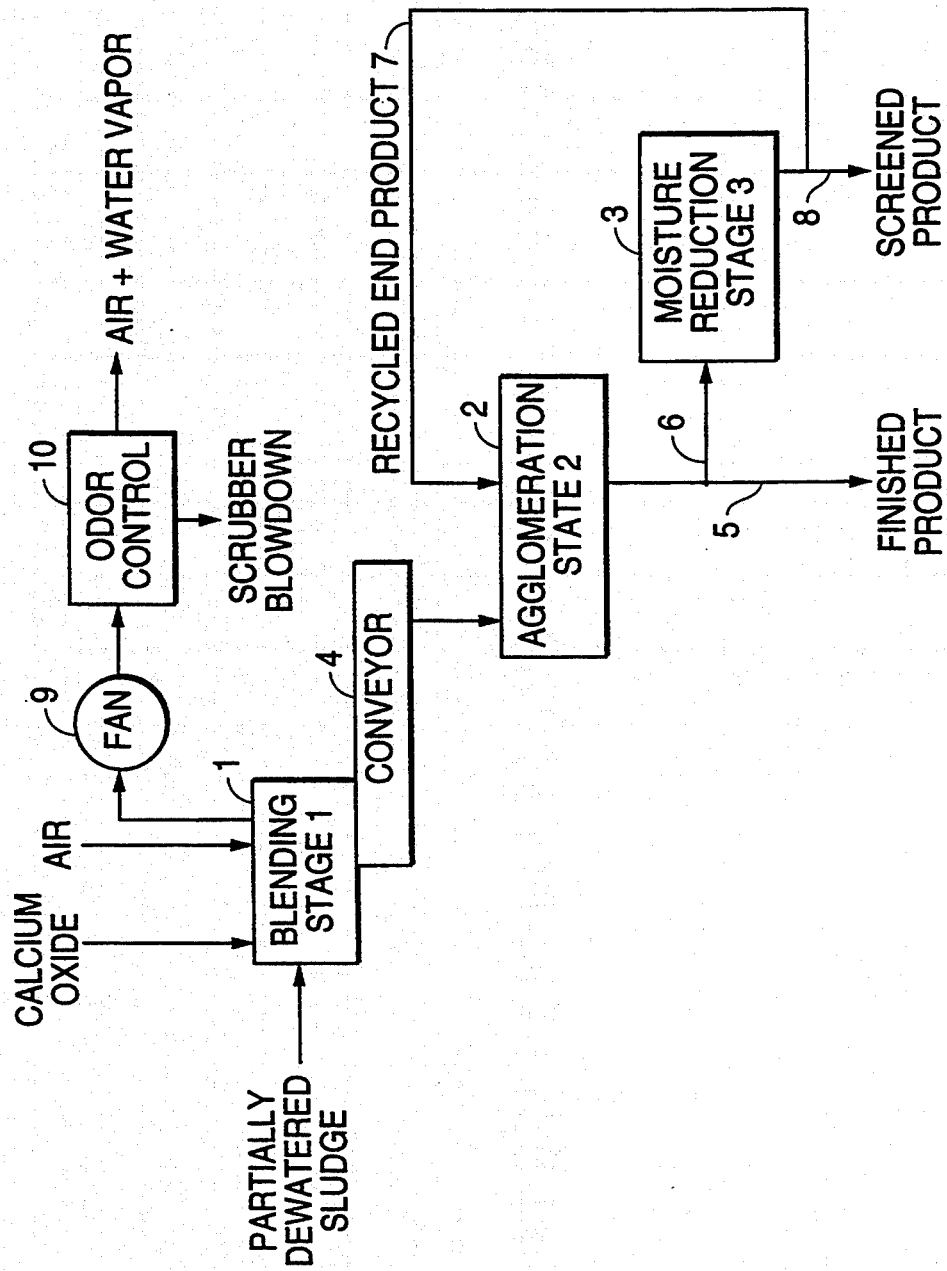
FIG. 1 is a flow diagram illustrating a process of producing a granular pathogenically stabilized sludge product in accordance with a first embodiment of the present invention including screening and classification of the agglomerated product in the moisture reduction stage before the recycling of a portion of the material.

Referring to FIG. 1, a process of producing a granular pathogenically stabilized sludge product in accordance with the present invention includes feeding partially dewatered sludge cake by a variable speed feeding mechanism into a blending or mixing apparatus 1 where it is to be thoroughly mixed with an alkaline material. Alkaline material in the form of quicklime (calcium oxide) is either subsequently, simultaneously or previously fed through a variable speed feeding mechanism to the blending apparatus 1. While the alkaline material used in accordance with the present invention is preferably quicklime; calcium hydroxide, cement kiln dust, lime kiln dust, fly ash or other calcium oxide containing material may be used. The rate of sludge feed and quicklime feed, along with the volume of the blender determine the amount of retention time in the blender. The drier the incoming sludge, the more retention time is required to insure each particle of calcium oxide comes in contact with water bound in the sludge to maximize the heat generated, thereby minimizing the amount of quicklime necessary for stabilization of the sludge. The rate of quicklime feed is determined by the water content of the sludge and the particular heat value required. Higher temperatures inactivate parasite ova quicker but use more quicklime. Lower temperatures require longer periods of time for inactivation. Generally, the pH stabilization requirements for sludges below 55% solids are met by the calcium oxide needed for the requisite heat generation.

In addition to raising pH and temperature, alkaline material will also affect the odor of the material. Calcium oxide will combine with or break down many odorous compounds. Increased pH also has an effect on odor: as the pH level goes above 8.9 pH, ammonia is forced out of solution and into the air. Air from the mixer is drawn off during the mixing process through an odor control unit such as a scrubber or spray condenser 10 by means of a fan 9 in order to draw off the ammonia, other malodorous compounds and water vapor produced when the mixture is heated. This assists in drying the material. The ammonia may be precipitated with chemicals to produce fertilizer (e.g. using phosphoric or sulfuric acid to produce ammonium phosphate or sulfate) which can be combined with the end product pellets to enhance their agricultural value, used as is as a fertilizing agent directly, or returned with the spray condenser water to the wastewater treatment plant for treatment.

In the present invention, it is preferred that the dewatered sludge be 10% to 60% solids by weight, that the temperature achieved within the blender be sufficient to inactivate parasite ova and not less than 70° C., that the amount of alkaline material be 10% to 150% of that of the partially dewatered sludge, and that the pH level attained during the process be no less than 12.

The sludge and quicklime mixture are then transferred continuously through and from the blender to a discharge receptacle in the form of a container or enclosed conveyor 4 where the total time spent in the blender and conveyor combination is equal to or slightly greater than the time required for parasite inactivation at the temperature produced in the mixture. This time being commensurate with the temperature of the mixture and not more than two hours. The container or conveyor 4 is typically a screw conveyor but can be any form of enclosed or partially enclosed container having an input and output for the purpose of retaining and conveying the mixture for a specified amount of time. Insulation of the blender and conveyor would aid in the retention of heat; however, the mixed sludge product tends to be self-insulating.

After the mixture has met pH, time and temperature requirements for pathogenic inactivation, it exits the conveyor 4 having a solids content in the range of 10%–60% solids and preferably approximately 40% solids. The mixture is then discharged into an agglomeration stage 2. The agglomeration stage allows for further drying of the material without the addition of additional calcium oxide material to form pellets from the mixture.

Most agglomerators either take a very dry product (80% solids or greater) and mix it with a liquid to form glomera, or start with a liquid and add powder. The agglomeration stage in accordance with the present invention process cuts dry material from the variable speed recycle conveyor 7 into the mixture input by conveyor 4 in the agglomerator 2. The recycled material acts as dry nuclei and are coated with the wetter paste material. The dry material increases the percent solids and absorbs surface moisture, thereby preventing the pellets from adhering to each other. The preferred percent solids of the pellets leaving the agglomeration stage is more than 70%, though the process can produce pellets in a range from 50% to 80% solids. The solids content of the pellets exiting the agglomeration stage is regulated by the amount of recycled material mixed in with the blended material.

By separating this agglomeration step from the blending step none of the recycled material need be reheated as in prior sludge heating and pelletization processes and finished product can be taken of directly after agglomeration. More importantly, material other than relatively expensive quicklime can be used to further dry the mixture, thus lessening the overall operation costs. With previous processes, the inexpensive materials used to promote drying and crumbling of sludge based products are fly ash, bottom ash, lime kiln dust and cement kiln dust. However, such materials face numerous shortcomings. The four most significant problems with using these types of materials are: First, since these materials are byproducts of a separate process, not the main product of such a process, their quality is not controlled and is free to vary; thus, characteristics important to sludge pelletization, such as moisture content can vary widely. Second, many of these combustion processes concentrate heavy metals in these waste products. In fact, a number of cement kilns around the country burn liquid hazardous waste as supplemental fuel. These pollutants would significantly limit the usefulness of the sludge based pellets in agricultural applications. Third, the use of these non-nutritive materials dilute the nutrient value of the end product, lessening its value in the agricultural market. And finally, these materials add to the overall process costs including transportation and storage costs.

In accordance with the present invention, it has ben found that the least expensive material available for further drying the mixture is the end product itself. It has the added advantage of being non-polluting and non-diluting. Prior to the recirculation of a portion of the end product into the agglomeration stage, the moisture content of the product is reduced in a moisture reduction stage 3. Some or all of the finished pellets leaving the agglomeration stage 2 by a chute or conveyor 5 are diverted by a conveyor 6 into the moisture reduction stage 3.

In the moisture reduction stage 3, drying is accomplished in practice by any number of different methods. The simplest method of decreasing moisture content is by curing. In blending tests, the maximum temperature attained occurs 3 to 15 minutes after the material exits the blender, indicating that hydration of calcium oxide is not instantaneous. Further tests have shown amounts of unreacted calcium oxide in granular material over one half hour old. By allowing more time for water to be absorbed in the hydration reaction, the material will naturally become drier.

The amount of material to be recycled depends on: how dry it is, how much paste sludge is produced in the blending stage and at what dryness, and the desired dryness of the pellets exiting the agglomeration stage. The drier the recycled product, the less material is required for recycle. It is preferable for the recycled material to contain at least 20% more solids than the pellets exiting the agglomeration stage, though lesser amounts of dryness are possible.

Other methods of moisture reduction which could be used are: air drying, heat drying and screening, or combinations of these methods. FIG. 1 shows how air handling of the material through screening equipment can be used. As shown in FIG. 1, the moisture reduction stage 3 includes an additional output chute or conveyor 8. Since small particles have a large surface to volume ratio, and since air handling would dry the surface, these particles would have a higher percent solids. The screening apparatus would separate these particles and recycle them through the recycle conveyor 7. The larger particles would be more uniform in size and dust free, a desirable characteristic for agricultural use. The screened pellets would exit the equipment through conveyor or chute 8 to a storage or transportation receptacle.

When screening the agglomerated product, the product is classified into essentially three classifications, acceptable size, those smaller than the acceptable size and those larger than the acceptable size. The acceptable size being predetermined in accordance with the intended use of the product. Once classified, smaller size products can be directly recycled to the agglomeration stage while the larger size product is first crumbled prior to being recycled. In addition, the smaller drier particles are particularly well suited for acting as dry nuclei for pellet formation in the agglomeration stage. Thus, as set forth hereinabove, by producing smaller particles which have a greater surface to volume ratio and greater exposure to air, the particles will include a higher percentage of solids, which are better suited for recycling in the above described process.

Figure 2:
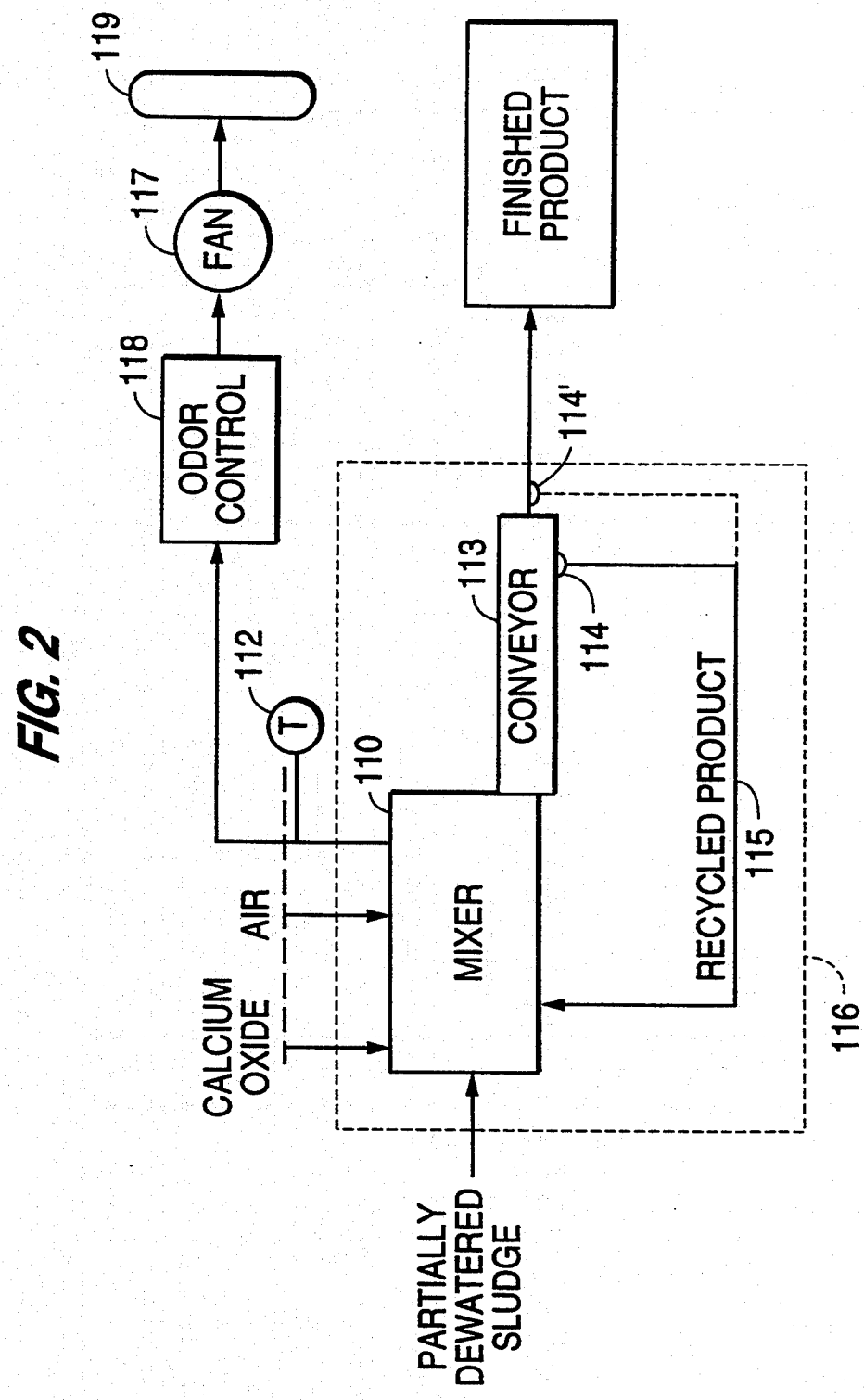
FIG. 2 is a flow diagram illustrating a process of producing a granular pathogenically stabilized sludge product in accordance with a preferred embodiment of the present invention.

Referring now to FIG. 2, the process and apparatus for treating sludge in accordance with a preferred embodiment of the present invention will be discussed in detail.

FIG. 2 is a flow diagram illustrating the process in accordance with the preferred embodiment of the present invention. With reference to FIG. 2, a process of producing a granular pathogenically stabilized sludge product includes feeding partially dewatered sludge by a variable speed feeding mechanism into a mixer 110 where it is to be thoroughly mixed with an alkaline material including lime (CaO). The mixer 110 being the same or similar to the mixer 1 illustrated in FIG. 1.

Alkaline material such as quicklime is simultaneously fed through a variable speed feeding mechanism to the mixer 110. Again, while the preferred alkaline material is quicklime; calcium hydroxide, cement kiln dust, lime kiln dust, fly ash or other calcium oxide containing material may be used. The rate of the lime feed is proportioned to the sludge feed in accordance with the temperature of the exhaust leaving the mixer. This temperature is determined by using a temperature sensor 112. The lime feed is increased or decreased in accordance with the temperature of the exhaust gas which is indicative of end product temperature.

Mixing lime with sludge as mentioned earlier increases temperature and pH of the end product. Increased pH and temperature kills or inactivates pathogens but also releases ammonia usually contained in the sludge. From the mixer 110, the end product at a temperature of no less than 70° C. (158° F.) and a pH of no less than 12 is discharged to a conveying system 113 schematically shown in FIG. 2. At a predetermined point in the conveying system 113, or at the end of the conveying system 113, a diverter 114 or 114' diverts or separates part of the product flow into a recycling conveying system 115. Experiments have demonstrated that diverting 10% to 60% of the product flow back to the mixer provides for a significant reduction in lime consumption (up to 40%). Such savings occur due to energy recovery and the utilization of unreacted lime as mentioned hereinabove.

Recycling also increases the end product dryness at the mixer 110 discharge because the product which is recycled has higher dryness than the raw sludge fed to the mixer (usually 45% to 50% total solids). Mixer 110, conveying systems 113 and 115 and diverter 114 are fully enclosed in housing 116 and forcefully ventilated by fan 117. The exhaust gas which includes air, water vapor (steam), particulate matter (dust), gaseous ammonia and other pollutants is treated by a wet scrubber 118. In the scrubber 118, ammonia, dust and other pollutants associated with the lime stabilization process are removed by scrubbing water used in the scrubber. If necessary, chemicals such as sulfuric acid, caustic and sodium hypochloride may be used to treat the exhaust and to achieve a high level of pollutant removal as required by federal and local regulations. After scrubbing, a clean, cool exhaust is released into the atmosphere by way of stack 119.

The above descriptions and Figures are for purposes of illustration only and are not intended to be, and should not be construed as, limitations on the invention. In addition, one skilled in the art could suggest many changes or modifications, all of which are intended to be within the spirit and scope of the present invention as defined in the appended claims.

Industrial Applicability

This process allows for more economical production of an agriculturally useful granular or pelletized product from sludges through the reduction in the consumption of lime or similar alkaline materials. These materials constitute the largest single cost item in such processes. The process can be used for producing a pathogen-free, uniform durable granular end product from sewage sludges or similar waste material

What is claimed is:

1. A process for substantially continuously treating partially dewatered sludge, said process comprising the steps of:
feeding a predetermined amount of partially dewatered sludge into a mixer;
adding a predetermined amount of alkaline material to the sludge in the mixer;
substantially continuously mixing the sludge and alkaline material together in said mixer to form a mixture including solid matter;
substantially continuously discharging said mixture from said mixer;
diverting at least a portion of said mixture including said solid matter exiting said mixer; and
recycling the diverted portion of said mixture including said solid matter to said mixer.

2. The process as defined in claim 1, wherein the step of discharging said mixture includes discharging said mixture to a conveying means for conveying the mixture away from said mixer.

3. The process as defined in claim 1, wherein said alkaline material is chosen from a group consisting of quicklime, lime kiln dust, cement kiln dust, lime, calcium hydroxide, fly ash and other alkaline materials.

4. The process as defined in claim 1, wherein said predetermined amount of alkaline material is 10% to 200% of a dry weight of the predetermined amount of sludge fed to the mixer.

5. The process as defined in claim 1, wherein said predetermined amount of alkaline material is a sufficient quantity to heat the mixture to a predetermined temperature and to raise a pH level of the mixture to a predetermined level.

6. The process as defined in claim 5, wherein said predetermined temperature is 70° C. (158° F.) and said temperature is maintained for at least 30 minutes in order to destroy pathogens and to reduce vector attraction of the end product.

7. The process as defined in claim 5, wherein said predetermined pH level is at least 12, and said pH level is maintained for at least 2 hours to destroy pathogens and reduce vector attraction of the end product.

8. A process for treating partially dewatered sludge, said process comprising the steps of:
feeding a predetermined amount of partially dewatered sludge into a mixer;
adding a predetermined amount of alkaline material to the sludge in the mixer in sufficient quantity to heat the mixture to a predetermined temperature, raising the pH level of the mixture to a predetermined level;
controlling the alkaline material feed in response to a temperature of exhaust gases given off by said mixture;
discharging the mixture including solid matter from said mixer to a discharge conveying means for transferring the mixture;
retaining the mixture in the mixer and the discharge conveying means for a predetermined period of time so as to provide a produce having a predetermined alkalinity level and void of pathogens; and
diverting a predetermined amount of the mixture exiting said discharge conveying means to a recycle conveying means for recycling said portion back into said mixer to save energy, reduce alkaline material consumption, increase the end product dryness and better control odor and air emission.

9. The process as defined in claim 8, wherein said predetermined amount of alkaline material is in the range of 10% to 200% of the dry weight of the sludge fed in the mixer.

10. The process as defined in claim 8, wherein the predetermined alkalinity level of the product is no less than 12 and the predetermined temperature is no less than 70° C. (158° F.) and these values are maintained for no less than 2 hours for pH level and 30 minutes for temperature level in order to destroy pathogens and to reduce vector attraction of the end product.

11. The process as defined in claim 8, wherein said predetermined amount of the product recycled back to said mixer is in the range of 10% to 60% of total product production to save energy, decrease alkaline material consumption and increase the product dryness.

12. The process as defined in claim 8, wherein the said mixer, said discharge conveying means and said recycle conveying means are enclosed in a housing, said housing being forcefully ventilated with exhaust being treated by a scrubbing process prior to release into the atmosphere to reduce air and odor pollution.

13. The process as defined in claim 8, wherein said alkaline material is chosen from a group consisting of quicklime, lime kiln dust, cement kiln dust, lime, calcium hydroxide, fly ash and other alkaline materials.

14. A process for substantially continuously treating partially dewatered sludge, said process comprising the steps of:
feeding a predetermined amount of partially dewatered sludge into a mixer;
adding a predetermined amount of alkaline material to the sludge in the mixer;
substantially continuously mixing the sludge and alkaline material together is said mixer to form a mixture including solid matter;
substantially continuously discharging said mixture from said mixer;
diverting at least a portion of said mixture exiting said mixer; and
recycling the diverted portion to said mixer;
wherein the diverted portion of said mixture including solid matter is approximately 10% to 60% of the total mixture exiting said mixer.

15. A process for substantially continuously treating partially dewatered sludge, said process comprising the steps of:

feeding a predetermined amount of partially dewatered sludge into a mixer;

adding a predetermined amount of alkaline material to the sludge in the mixer;

substantially continuously mixing the sludge and alkaline material together in said mixer to form a mixture including solid matter;

substantially continuously discharging said mixture from said mixer to a conveying means for conveying the mixture away from said mixer;

enclosing said mixer and said conveying means in a housing and ventilating said housing;

diverting at least a portion of said mixture including solid matter exiting said mixer; and recycling the diverted portion to said mixer.

16. The process as defined in claim 15 wherein said step of ventilating said housing includes drawing off exhaust from said mixture.

17. The process as defined in claim 16, wherein said exhaust is subjected to a scrubbing processes before being emitted to the atmosphere.

* * * * *